(12) United States Patent
Strasser

(10) Patent No.: US 9,762,162 B2
(45) Date of Patent: Sep. 12, 2017

(54) METHOD OF OPERATING A DRIVE DEVICE AND CORRESPONDING DRIVE DEVICE

(71) Applicant: AUDI AG, Ingolstadt (DE)

(72) Inventor: Roman Strasser, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/952,566

(22) Filed: Nov. 25, 2015

(65) Prior Publication Data

US 2016/0156293 A1 Jun. 2, 2016

(30) Foreign Application Priority Data

Nov. 27, 2014 (DE) .................. 10 2014 017 570

(51) Int. Cl.
| | |
|---|---|
| *G01R 31/02* | (2006.01) |
| *H02P 21/00* | (2016.01) |
| *B60L 11/18* | (2006.01) |
| *H02P 29/50* | (2016.01) |
| *H02P 6/15* | (2016.01) |

(52) U.S. Cl.
CPC .......... *H02P 21/0003* (2013.01); *B60L 11/18* (2013.01); *H02P 6/15* (2016.02); *H02P 29/50* (2016.02)

(58) Field of Classification Search
CPC .......... B60Q 5/008; B60Q 9/00; G10K 15/02; H04R 2499/13; G01C 21/3697
See application file for complete search history.

(56) References Cited

U.S. PATENT DOCUMENTS

| | | | | | |
|---|---|---|---|---|---|
| 5,545,954 | A | * | 8/1996 | Furukoshi | H02N 2/142 310/311 |
| 6,384,550 | B1 | * | 5/2002 | Miyakawa | H04R 23/00 310/316.02 |
| 6,753,663 | B2 | | 6/2004 | Jung et al. | |
| 8,942,878 | B2 | | 1/2015 | Schuessler | |
| 2011/0304445 | A1 | * | 12/2011 | Nakayama | B60Q 5/008 340/425.5 |
| 2013/0076504 | A1 | * | 3/2013 | Nakayama | B60Q 5/008 340/466 |
| 2013/0142352 | A1 | * | 6/2013 | Koch | G10K 15/02 381/86 |
| 2014/0079234 | A1 | * | 3/2014 | Butts | G10L 21/0208 381/71.6 |
| 2014/0328494 | A1 | | 11/2014 | Pommerer et al. | |
| 2015/0038869 | A1 | * | 2/2015 | Simon | A61B 5/7221 600/544 |
| 2015/0235554 | A1 | * | 8/2015 | Kaminade | G08G 1/01 340/943 |

FOREIGN PATENT DOCUMENTS

| | | |
|---|---|---|
| DE | 199 38 670 A1 | 5/2001 |
| DE | 10 2011 112 181 A1 | 4/2012 |
| DE | 10 2011 112 236 A1 | 4/2012 |

(Continued)

*Primary Examiner* — Shawki S Ismail
*Assistant Examiner* — Zoheb Imtiaz
(74) *Attorney, Agent, or Firm* — Henry M. Feiereisen LLC

(57) ABSTRACT

In a method of operating a drive device, a sound signal is generated as a function of at least one operational and/or state variable. An electric machine of the drive device is hereby as a sound generator to output the sound signal. The sound signal can be determined from a time gradient of the operational and/or state variable.

9 Claims, 1 Drawing Sheet

(56) References Cited

FOREIGN PATENT DOCUMENTS

| | | |
|---|---|---|
| DE | 10 2010 043 973 A1 | 5/2012 |
| DE | 10 2011 108 956 A1 | 1/2013 |
| DE | 10 2011 056 688 A1 | 6/2013 |
| DE | 10 2012 211 689 A1 | 1/2014 |
| DE | 10 2013 017 582 A1 | 4/2014 |
| DE | 10 2013 208 098 A1 | 11/2014 |

* cited by examiner

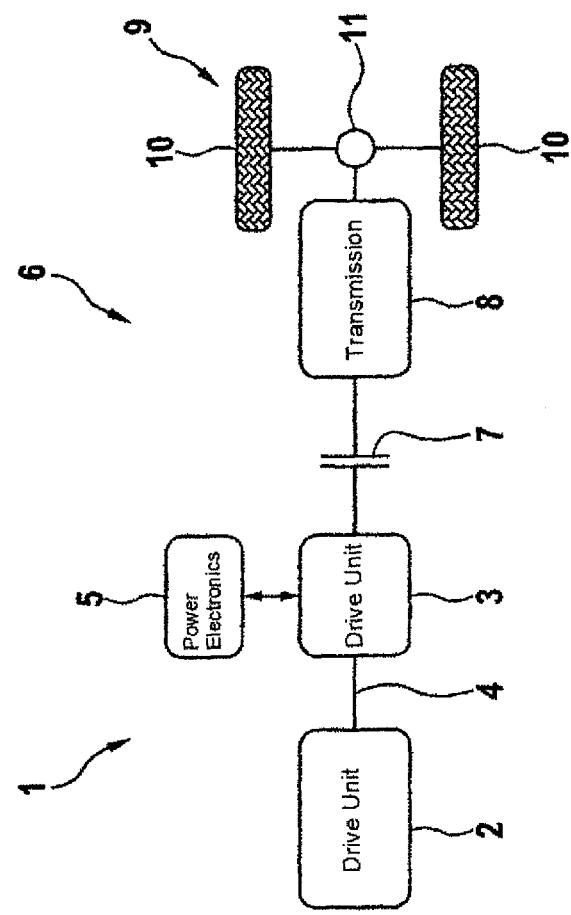

METHOD OF OPERATING A DRIVE DEVICE AND CORRESPONDING DRIVE DEVICE

CROSS-REFERENCES TO RELATED APPLICATIONS

This application claims the priority of German Patent Application, Serial No. 10 2014 017 570.7, filed Nov. 27, 2014, pursuant to 35 U.S.C. 119(a)-(d), the disclosure of which is incorporated herein by reference in its entirety as if fully set forth herein.

BACKGROUND OF THE INVENTION

The present invention relates to a method of operating a drive device, and to a corresponding drive device.

The following discussion of related art is provided to assist the reader in understanding the advantages of the invention, and is not to be construed as an admission that this related art is prior art to this invention.

A drive device of a type involved here can be used in a motor vehicle to provide a torque for powering a motor vehicle. The drive device may be a purely electric drive device which has one electric machine or several electric machines. The drive device may, of course, also involve a hybrid drive device which has different drive units, with one of the drive units being an electric machine. Another drive unit may involve an internal combustion engine.

When a hybrid drive device is involved, at least two drive units jointly provide, at least temporarily, a drive torque of the drive device and thus are linked to one another or can be linked to one another. Of course, the electric machine of the drive device may also represent merely an auxiliary power unit or an auxiliary drive, for example as starter for the internal combustion engine and/or as generator which is powered for example by the internal combustion engine and/or kinetic energy of the motor vehicle.

The electric machine may also be a component of a torque-vectoring device for example, in particular when several axles of the motor vehicle are operatively connected or can be operatively connected via a superposition unit. The electric machine is associated in this case to the superposition unit for example and distributes the torque to the axles. In principle, any drive topology of the motor vehicle may, however, be selected. For example, the motor vehicle may involve a BEC motor vehicle (BEV: Battery Electric Vehicle) and be powered by a wheel-hub drive or a fuel-cell drive. When the hybrid drive device is involved, a serial, parallel or power-split variant may be realized.

Especially when a purely electric drive device is involved, but also in the case of a hybrid drive device when operated solely by the electric machine, noise emission of the drive device is substantially reduced compared to the engine noise of an internal combustion engine. A driver as well as persons in the surroundings of the motor vehicle are not accustomed to this. In particular, they lack the possibility to use noise emissions or operational sounds of the drive device to make a determination about the rotation speed and thus indirectly about the travel speed of the motor vehicle.

It would therefore be desirable and advantageous to provide an improved method of operating a drive device to obviate prior art shortcomings.

SUMMARY OF THE INVENTION

According to one aspect of the present invention, a method of operating a drive device includes generating a sound signal as a function of at least one operational and/or state variable, and using an electric machine of the drive device as a sound generator to output the sound signal.

The present invention resolves prior art problems by activating the electric machine such as to generate a sound emission or operating sound in response to the sound signal. By using the electric machine itself, the need for an external sound generator, e.g. loudspeaker or the like, to output a sound signal can be eliminated.

To date, the automobile industry typically strives to operate the drive device and thus the electric machine with lowest possible noise emission. Therefore, a drive frequency is selected for the electric machine that is relatively high, e.g. of at least 10 kHz. Such a drive frequency enables operation of the electric machine with little noise emission. Provision is now being made in accordance with another advantageous feature of the present invention and in contrast to conventional approaches, to lower the drive frequency in order for the electric machine to generate a sound emission commensurate with the sound signal. In this way, the need for additional technical equipment, like an external sound generator, e.g. loudspeaker, can be eliminated. In the absence of an external sound generator, sound emission can be realized in both an interior space of the motor vehicle and in the surroundings of the motor vehicle to inform the driver and/or any persons in vicinity of the motor vehicle about the operating state of the motor vehicle. Thus, the emotional attachment of the driver to the motor vehicle is improved.

The electric machine is thus used to generate specific sounds or sound emissions to enable the driver to emotionally perceive the motor vehicle.

According to another advantageous feature of the present invention, the sound signal can be determined from a time gradient of the operational and/or state variable. While, of course, the operational and/or state variable can be directly based upon the sound signal, it has shown to be advantageous to use the time gradient. Of course, a combination of the operational and/or state variable with its time gradient can be applied to generate the sound signal. Only a single operational and/or state variable or its time gradient can be used to determine the sound signal. Currently, it is, however, advantageous to use several operational and/or state variables and/or their time gradients to determine the sound signal.

According to another advantageous feature of the present invention, the operational and/or state variable may involve a control pedal value, a rotation speed of the electric machine, a torque generated by the electric machine, a travel mode setting, or a speed of a motor vehicle. As described above, only a single operational and/or state variable or its time gradient can be used to determine the sound signal. Currently preferred is, however, the application of several, especially all of the afore-mentioned operational and/or state variable.

The operational and/or state variable may involve, for example, a control pedal value which reflects a position of the control pedal, in particular an accelerator pedal, brake pedal, or clutch pedal. In addition, or as an alternative, the rotation speed of the electric machine or the drive device can be considered. Also the torque generated by the electric machine can be used to determine the sound signal.

This is especially applicable for the travel mode setting by which an operating mode of the drive device and/or a transmission of the motor vehicle can be specified. For example, the travel mode setting can be used to select whether the ride of the motor vehicle should be more sporty or more comfortable, or whether the motor vehicle should be operated purely electrical or as hybrid. In particular, the travel mode setting defines the rotation speed limits for the drive device to have the transmission trigger a gear change up or down. In addition, or as an alternative, it is, of course, also possible to consider the speed or travel speed of the motor vehicle when determining the sound signal.

According to another advantageous feature of the present invention, an input signal of the electric machine can be determined in response to the sound signal. The input signal can be provided to the electric machine via a power electronics. The input signal is thus applied directly on terminals of the electric machine. For example, the electric machine may be configured as a three-phase machine and thus has three terminals. The input signal includes only sub-signals for each of the terminals or for each of the phases of the electric machine. The input signal is, of course, selected initially such that the desired or predefined operational state of the electric machine is reached. This means that the sound signal is considered only subordinated for the determination of the input signal. Of course, the priority may, however, also be selected reversed.

According to another advantageous feature of the present invention, the input signal can be determined as a function of a predefined rotation speed and/or predefined torque. The predefined rotation speed and/or predefined torque can be specified by the driver of the motor vehicle and/or a driver assist system. The predefined rotation speed corresponds to the one rotation speed which the electric machine is supposed to reach, once the input signal is inputted into the electric machine. The input signal is thus determined such that the predefined rotation speed is set at the electric machine. The same applies to the predefined torque. Provision may hereby be made for the actual rotation speed and/or actual torque of the electric machine to be considered in the input signal, for example within the context of a control system.

According to another advantageous feature of the present invention, a drive frequency of the input signal can be selected at a level which decreases as a level of the sound signal increases. As described above, the drive frequency is normally at least 10 kHz to render the operation of the electric machine with as little noise as possible. To use the electric machine as sound generator, the drive frequency can now be selected in such a way that the sound emission is perceived increasingly more intense as the drive frequency of the input signal decreases. Thus, the drive frequency decreases as the level of sound emission increases.

For example, the drive frequency should correspond to a specified normal operating frequency, when the level of the sound signal lies below a particular value, in particular equals zero. The normal operating frequency is, for example, at least 10 kHz, at least 12.5 kHz, or at least 15 kHz. As the level of the sound signal increases, the drive frequency decreases accordingly starting from the normal operating frequency. For example, a minimum frequency may be specified which the drive frequency reaches when the sound signal reaches a certain level. This minimum frequency may be a predefined constant value. The drive frequency is now limited downwardly to this minimum frequency, i.e. the drive frequency cannot be smaller than the minimum frequency.

According to another advantageous feature of the present invention, the input signal may be generated from a superimposition of a sinusoidal signal with a square wave signal, with a proportion of the square wave signal increasing as a level of the sound signal increases. The noise level during operation of the electric machine decreases the closer the input signal approaches the sinusoidal signal. Conversely, noise emission is normally at a maximum, when the square wave signal is fed to the electric machine as input signal.

Accordingly, the input signal shall now be comprised of the sinusoidal signal and the square wave signal at proportions that are variable. The input signal may thus correspond precisely to the sinusoidal signal at a first level for the sound signal, whereas the input signal solely corresponds to the square wave signal at a second level which is greater than the first level. Depending on the level of the sound signal, it becomes possible to adjust the intensity of the sound emission generated by the electric machine.

It is readily apparent that the input signal can basically be generated in any suitable way, in particular when using different modulation processes and/or different current forms or current profiles. Examples include sinusoidal modulation and space-vector modulation. Examples of a current form can include the sinusoidal signal, the square wave signal, a trapezoidal signal, or a block signal.

According to another aspect of the present invention, a drive device includes at least one electric machine configured to operate as a sound generator to output a sound signal generated as a function of at least one operational and/or state variable.

Thus, as already described above, the electric machine is used as sound generator. The drive device can be configured to generate the sound signal from the operational and/or state variable and to subsequently output the sound signal, using the electric machine, i.e. the drive device uses the electric machine as sound generator.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic representation of a drive device, having embodied therein the subject matter of the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment may be illustrated by graphic symbols, phantom lines, diagrammatic representation and fragmentary view. In certain instances, details which are not necessary for an understanding of the present invention or which render other details difficult to perceive may have been omitted.

Turning now to FIG. 1, there is shown a schematic representation of a drive device, generally designated by reference numeral 1 and having embodied therein the subject matter of the present invention. The drive device 1 may find application in a motor vehicle and is shown here in the form of a hybrid drive device which includes at least two drive units, i.e. a first drive unit 2 and a second drive unit 3. The first drive unit 2 may involve an internal combustion engine and the second drive unit 3 may involve an electric machine.

Both drive units 2, 3 can be operatively connected via a shaft 4 in a rigid and/or permanent manner. A separating clutch may, however, also be arranged in the shaft 4 to cut the operative connection between the drive units 2, 3. The second drive unit 3 or the electric machine is activated by a power electronics which in turn is operated by a control unit (not shown).

FIG. 1 shows in addition to the drive device 1 further components of a drive train 6 of a motor vehicle. The drive train 6 includes besides the drive device 1 a starting clutch 7 and a transmission 8 which is operatively connected or at least can be operatively connected via the starting clutch 7 with the drive device 1. The drive train 6 further includes an axle 9 to which two wheels 10 are associated. The axle 9 and the wheels 10 are advantageously operatively connected, especially rigidly and/or permanently, via an axle differential 11 with the manual transmission. Thus, the axle 9 and the wheels 10 can be powered by the drive device 1.

Provision is now being made to generate during operation of the drive device 1 a sound signal as a function of at least one operational and/or state variable of the motor vehicle, in particular of the drive device 1. This sound signal is outputted by a sound generator. In the non-limiting example, shown here, the function of the sound generator is assumed by the second drive unit 3, i.e. the electric machine, to generate sound emissions of the drive device 1 to inform a driver of the motor vehicle and/or further persons, for example in vicinity of the motor vehicle, about the operating state of the drive device 1. There is no need for the provision of an external sound generator.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of operating a drive device, comprising:
   using said drive device for powering a battery electric vehicle by providing and distributing a torque to axles of the vehicle;
   generating a sound signal as a function of at least one operational and/or state variable;
   using an electric machine of the drive device as a sound generator to output the sound signal starting from a normal operating frequency of at least 10 kHz, and
   determining an input signal of the electric machine in response to the sound signal, wherein the input signal is generated from a superimposition of a sinusoidal, trapezoidal or a block signal with a square wave signal, with a proportion of the square wave signal increasing as a level of the sound signal increases and the operating frequency decreasing to a predetermined constant value.

2. The method of claim 1, wherein the sound signal is determined from a time gradient of the operational and/or state variable.

3. The method of claim 1, wherein the operational and/or state variable is a variable selected from the group consisting of a control pedal value, a rotation speed of the electric machine, a torque generated by the electric machine, a travel mode setting, and a speed of a motor vehicle.

4. The method of claim 1, wherein the input signal is determined as a function of a predefined rotation speed and/or predefined torque.

5. The method of claim 1, further comprising selecting a drive frequency of the input signal at a level which increases as a level of the sound signal increases.

6. A drive device for powering a battery electric vehicle by providing and distributing a torque to axles of the vehicle, comprising at least one electric machine configured to operate as a sound generator to output a sound signal starting from a normal operating frequency of at least 10 kHz generated as a function of at least one operational and/or state variable, and to determine an input signal of the electric machine in response to the sound signal, wherein the input signal is generated from a superimposition of a sinusoidal, trapezoidal or a block signal with a square wave signal, with a proportion of the square wave signal increasing as a level of the sound signal increases and the operating frequency decreasing to a predetermined constant value.

7. The drive device of claim 6, wherein the sound signal is determined from a time gradient of the operational and/or state variable.

8. The drive device of claim 6, wherein the operational and/or state variable is a variable selected from the group consisting of a control pedal value, a rotation speed of the electric machine, a torque generated by the electric machine, a travel mode setting, and a speed of a motor vehicle.

9. The drive device of claim 6, wherein the input signal is determined as a function of a predefined rotation speed and/or predefined torque.

\* \* \* \* \*